United States Patent
Pribisic

(10) Patent No.: US 10,913,397 B2
(45) Date of Patent: Feb. 9, 2021

(54) AUTOMATED RETRACTABLE STEP SYSTEM, SENSOR SYSTEM FOR A MOVEABLE VEHICLE MEMBER, AND ACTUATOR ASSEMBLY FOR A MOVEABLE VEHICLE MEMBER

(71) Applicant: MAGNA CLOSURES INC., Newmarket (CA)

(72) Inventor: Mirko Pribisic, North York (CA)

(73) Assignee: MAGNA CLOSURES INC., Newmarket (CA)

( * ) Notice: Subject to any disclaimer, the term of this patent is extended or adjusted under 35 U.S.C. 154(b) by 211 days.

(21) Appl. No.: 16/180,088

(22) Filed: Nov. 5, 2018

(65) Prior Publication Data

US 2019/0071021 A1 Mar. 7, 2019

Related U.S. Application Data

(63) Continuation of application No. 15/160,427, filed on May 20, 2016, now Pat. No. 10,118,557.

(60) Provisional application No. 62/165,676, filed on May 22, 2015.

(51) Int. Cl.
B60R 3/02 (2006.01)
(52) U.S. Cl.
CPC ..................... B60R 3/02 (2013.01)
(58) Field of Classification Search
CPC ....................................................... B60R 3/02
See application file for complete search history.

(56) References Cited

U.S. PATENT DOCUMENTS

| | | |
|---|---|---|
| 5,442,347 A | 8/1995 | Vranish |
| 7,976,042 B2 | 7/2011 | Watson et al. |
| 8,342,551 B2 | 1/2013 | Watson |
| 8,602,431 B1 | 12/2013 | May |
| 8,662,512 B2 | 3/2014 | May |
| 8,692,565 B2 | 4/2014 | Togura |
| 8,714,575 B2 | 5/2014 | Watson |
| 8,833,782 B2 | 9/2014 | Huotari et al. |
| 9,205,781 B1 | 12/2015 | May |
| 2005/0068712 A1 | 3/2005 | Schulz et al. |

(Continued)

FOREIGN PATENT DOCUMENTS

WO WO2014140888 A2 9/2014

*Primary Examiner* — Michael V Kerrigan
(74) *Attorney, Agent, or Firm* — Dickinson Wright PLLC

(57) ABSTRACT

An automated retractable step system has at least one linkage subassembly for attachment to a vehicle frame. A step is attached to the linkage subassembly and is movable between a stowed position and a deployed position. An actuator is coupled with the linkage subassembly for moving the step between the stowed and deployed positions. A sensor subassembly includes a sensing electrode and a reference electrode disposed adjacent to the sensing electrode and a driven shield electrode extending generally parallel to and in a spaced relationship with the sensing electrode and the reference electrode. A controller is electrically connected to the sensing electrode and to the reference electrode and to the driven shield electrode. The controller is also electrically connected to the actuator for controlling the actuator to move the step between the stowed position and the deployed position in response to the signal from the sensor subassembly.

17 Claims, 9 Drawing Sheets

(56) References Cited

U.S. PATENT DOCUMENTS

| | | | |
|---|---|---|---|
| 2011/0276234 A1* | 11/2011 | Van Gastel | E05B 81/78 |
| | | | 701/49 |
| 2013/0311039 A1 | 11/2013 | Washeleski et al. | |
| 2015/0042060 A1 | 2/2015 | Cha et al. | |
| 2015/0123374 A1* | 5/2015 | Smith | B60R 3/002 |
| | | | 280/166 |
| 2015/0291102 A1 | 10/2015 | Smith | |

* cited by examiner

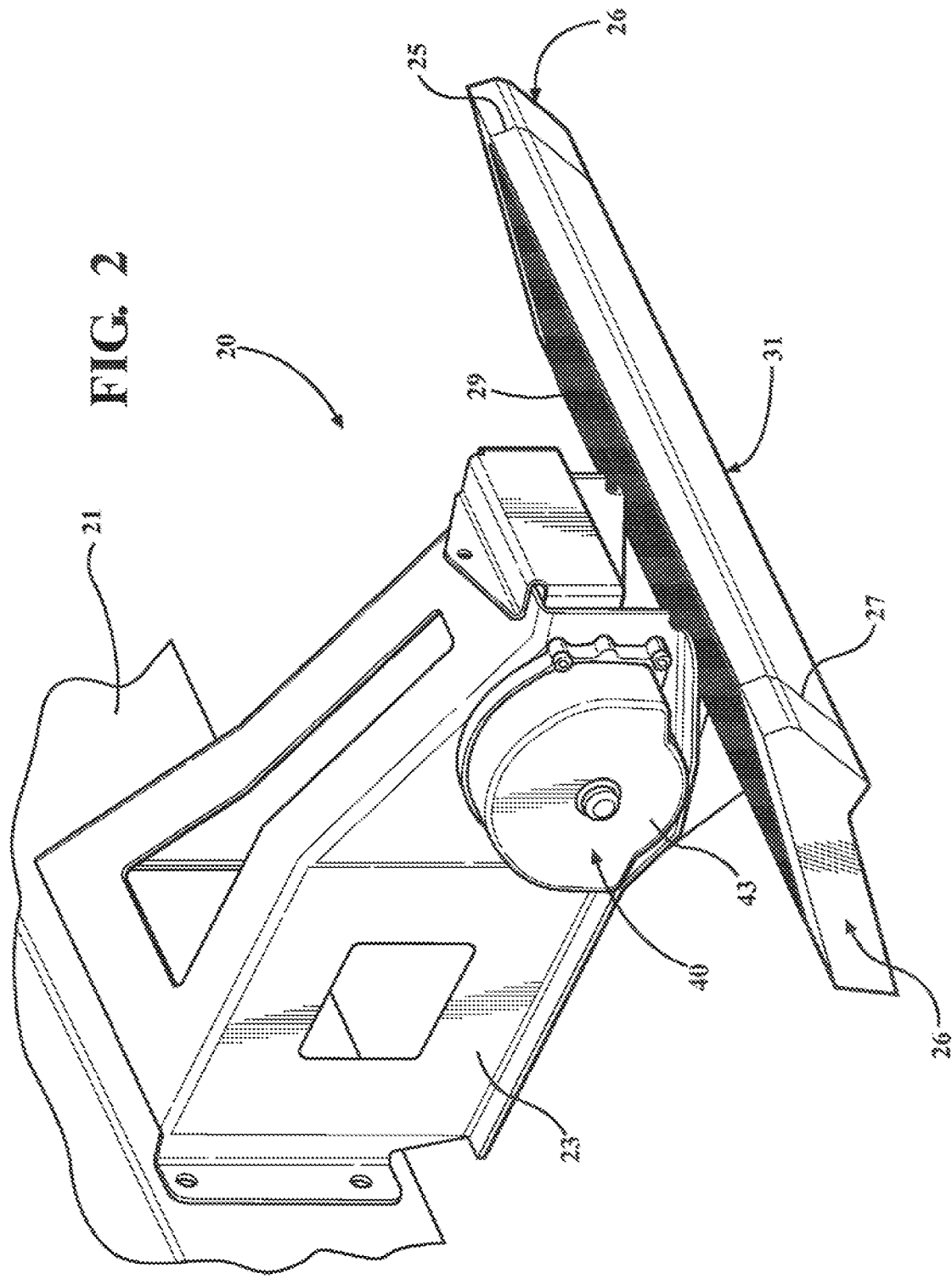

AUTOMATED RETRACTABLE STEP SYSTEM, SENSOR SYSTEM FOR A MOVEABLE VEHICLE MEMBER, AND ACTUATOR ASSEMBLY FOR A MOVEABLE VEHICLE MEMBER

CROSS-REFERENCE TO RELATED APPLICATION

This application is a continuation of U.S. patent application Ser. No. 15/160,427 filed May 20, 2016 which claims the benefit of U.S. Provisional Application Ser. No. 62/165,676, filed May 22, 2015. The entire content of each of the above applications is incorporated herein by reference.

FIELD OF THE INVENTION

The present disclosure relates generally to automotive vehicles, and more particularly to actuatable members on motor vehicles, such as steps and running boards, and to electronic sensor systems and actuator assemblies therefor.

BACKGROUND OF THE INVENTION

This section provides background information related to the present disclosure which is not necessarily prior art.

Drop-down or retractable steps and running boards for vehicles are generally known, and are most commonly used for sport utility vehicles and pick-up trucks, which sit relatively high off of the ground as compared to a typical passenger vehicle. Retractable steps move between a retracted position stowed adjacent to the vehicle frame or body and a deployed position extended for use away from the vehicle frame.

Typical retractable steps are activated for movement to the deployed position by a signal received by a vehicle's computer, wherein the signal is directly associated with a signal indicating that one or more of the doors are open, sometimes referred to as a "door ajar" signal. Each retractable step may be activated separately from one another, depending on which side of the vehicle a door has been opened. Similarly, some trucks are known to include retractable steps to provide access to a truck bed. These steps may also be controlled based on the door ajar signal, or may alternatively be controlled using a manual switch.

One problem that exists with current retractable steps occurs during installation, in that configuring the step to be actuated based on the door ajar signal in the vehicle computer is laborious and time consuming. Additionally, different vehicle assembly lines have different methodologies for identifying the vehicle's door ajar signal, which may change the way the retractable step is configured for actuation and installed on the vehicle.

Accordingly, there exists a need for a retractable step system which actuates when desired, independently from the door ajar signal, facilitates ease of installation and convenient of use, including hands-free operation.

SUMMARY OF THE INVENTION

This section provides a general summary of the present disclosure and is not intended to be interpreted as a comprehensive disclosure of its full scope or all of its features, aspects and objectives.

It is one aspect of the present disclosure to provide an automated extendable/retractable step system including at least one linkage subassembly for attachment to a vehicle frame. A step is attached to the linkage subassembly and is movable between a retracted, stowed position in proximity to the vehicle frame and an extended, deployed position disposed away from the vehicle frame. An actuator is operably coupled with the step via the linkage subassembly, wherein the actuator drives the linkage assembly to move the step between the stowed position and the deployed position. A sensor subassembly and a controller, wherein the controller is configured in electrical communication with an electrical power source, the sensor subassembly, and with the actuator for signaling the actuator to move the step between the stowed and deployed positions in response to a signal received from the sensor subassembly.

In accordance with another aspect of the invention, the sensor subassembly of the automated retractable step system can include a sensing electrode and a reference electrode disposed adjacent the sensing electrode.

In accordance with another aspect of the invention, the sensor subassembly of the automated retractable step system can be configured such that the reference electrode extends about the sensing electrode in laterally spaced relation therefrom.

In accordance with another aspect of the invention, the reference electrode and the sensing electrode of the automated retractable step system can be configured in substantially coplanar relation with one another.

In accordance with another aspect of the invention, the sensor subassembly of the automated retractable step system can include a driven shield electrode overlying the sensing electrode and the reference electrode to inhibit parasitic capacitance between a vehicle frame member and the sensing and reference electrodes.

In accordance with another aspect of the invention, the driven shield electrode of the automated retractable step system can be configured to extend within a plane generally parallel to and in a spaced relation with plane containing the sensing electrode and the reference electrode.

In accordance with another aspect of the invention, a sensor system for a moveable vehicle member is provided. The sensor system includes a sensor subassembly including a sensing electrode and a reference electrode disposed adjacent the sensing electrode. Further, a controller is configured in operable communication with the sensor subassembly for commanding the moveable vehicle member to move between a deployed state and a retracted state in response to receiving a signal from the sensor subassembly.

In accordance with another aspect of the invention, the reference electrode of the sensor system can be configured to extend about the sensing electrode in spaced relation therefrom.

In accordance with another aspect of the invention, the reference electrode and the sensing electrode of the sensor system can be in substantially coplanar relation with one another.

In accordance with another aspect of the invention, the sensor subassembly of the sensor system can include a driven shield electrode overlying the sensing electrode and t reference electrode.

In accordance with another aspect of the invention, the driven shield electrode of the sensor system can be configured to extend within a plane generally parallel to and in a spaced relation with the plane containing the sensing electrode and the reference electrode.

In accordance with another aspect of the invention, the controller of the sensor system can be configured having a sleep state and a power state, wherein controller scans for singles from the sensor subassembly over a first time interval while in the sleep state and scans for signals from the sensor subassembly over a second time interval while in the power state, wherein the first time interval is greater than the second time interval.

In accordance with another aspect of the invention, an actuator assembly is provided for operably controlling the movement of a vehicle component. The actuator assembly includes an actuator, a controller and a sensor subassembly having a sensing electrode, a reference electrode, and a driven shield electrode. The controller is configured in electrical communication with an electrical power source, the sensor subassembly, and with the actuator for signaling the actuator to move the vehicle component in response to a signal received from the sensor subassembly.

These and other aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent to one possessing ordinary skill in the art from the following written description and appended claims when considered in combination with the appended drawings, in which:

FIG. 2 is view similar to FIG. 1A showing the step in a retracted, stowed position;

DETAILED DESCRIPTION OF THE INVENTION

Figure 1:
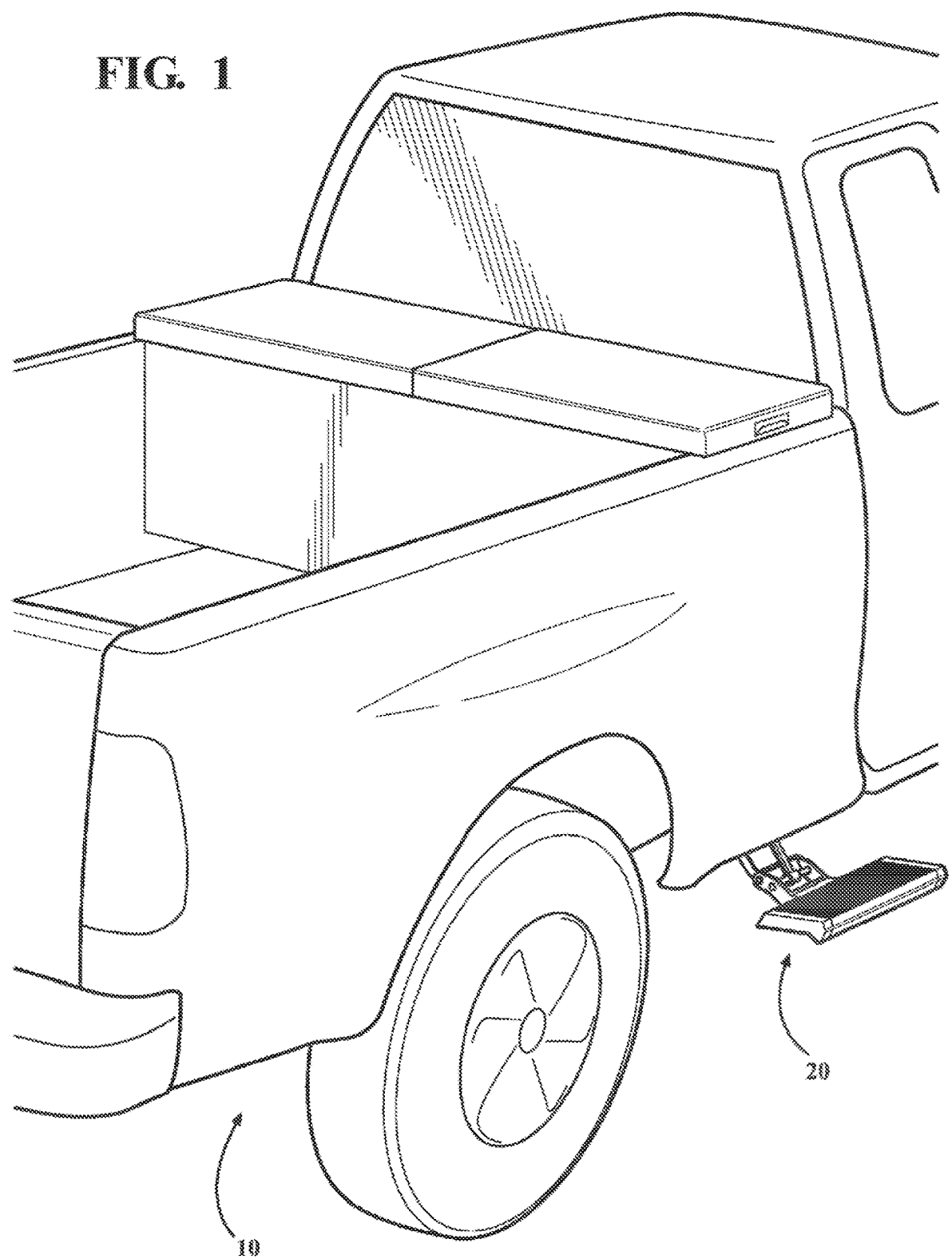
FIG. 1 is a partial perspective view of a vehicle having an automated extendable/retractable step system in accordance with an aspect of the disclosure illustrating the system in an extended, deployed position.
Figure 1A:
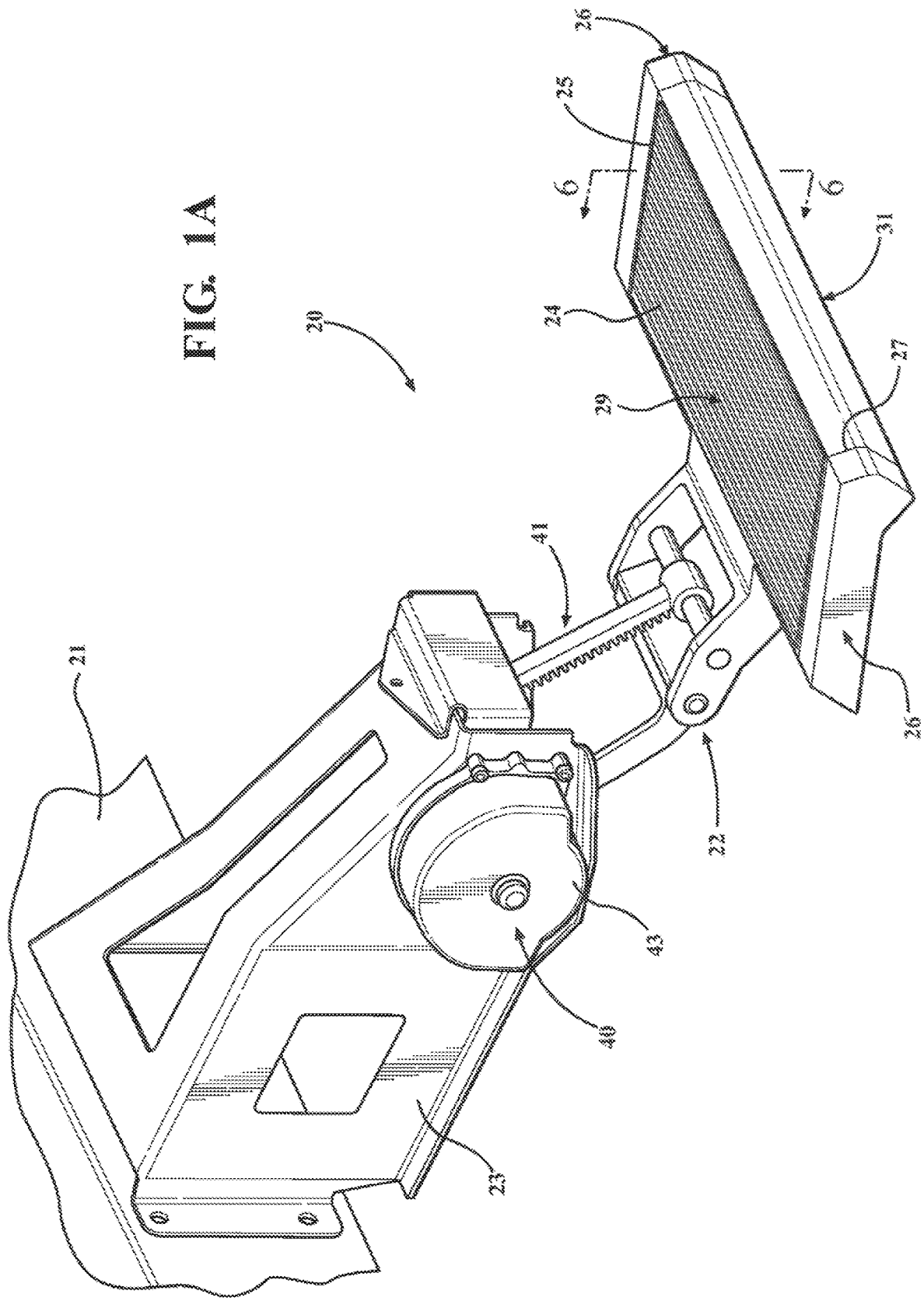
FIG. 1A is an enlarged perspective view of the automated extendable/retractable step system of FIG. 1 illustrating a step of the step system in an extended, deployed position.

In the following description, details are set forth to provide an understanding of the present disclosure. In some instances, certain circuits, structures and techniques have not been described or shown in detail in order not to obscure the disclosure.

For clarity purposes, example embodiments are discussed herein to convey the scope of the disclosure to those skilled in the relevant art. Numerous specific details are set forth such as examples of specific components, devices, and methods, in order to provide a thorough understanding of embodiments of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

In general, the present disclosure relates to automated movement systems of the type well-suited for use in virtually all vehicle applications. The automated retractable step system of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

More specifically, the present disclosure relates to a system for deploying or retracting a step on a vehicle. The automated retractable step system, however, should be understood to also contemplate control of other vehicle structures including running boards and closure members capable of being open/closed and/or released in association with a vehicle.

Referring to the Figures, wherein like numerals indicate corresponding parts throughout the several views, an automated retractable/extendable step system, referred to hereafter as step system 20, is disclosed. According to an aspect of the disclosure, the step system 20 is used for a vehicle 10, and is shown incorporated for use as a truck bed step (e.g. forward of the rear wheel of a truck or at the rear of the truck to gain access to the rear cargo bed of a truck; however, the step system 20 could instead be used for retractable running boards on a standard SUV, for example. As best shown in the extended, deployed position of FIG. 1, the step system 20 includes at least one linkage subassembly 22 operably connected to a mount member 23 for attachment to a vehicle frame member 21. A step 24 is attached to one end of the linkage subassembly 22, while the mount member 23 is attached to an opposite end of the linkage subassembly 22. The step 24 is movable between an extended, deployed position (FIG. 1) disposed away from the vehicle frame and a retracted, stowed position (FIG. 2) in proximity to the vehicle frame.

Figure 3:
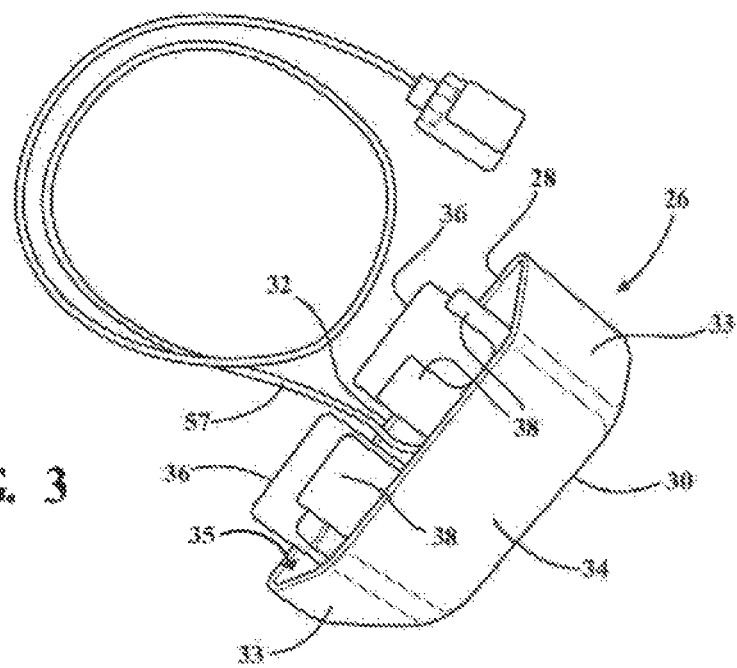
FIG. 3 is a bottom perspective view of an end cap of the step system of FIG. 2.
Figure 4:
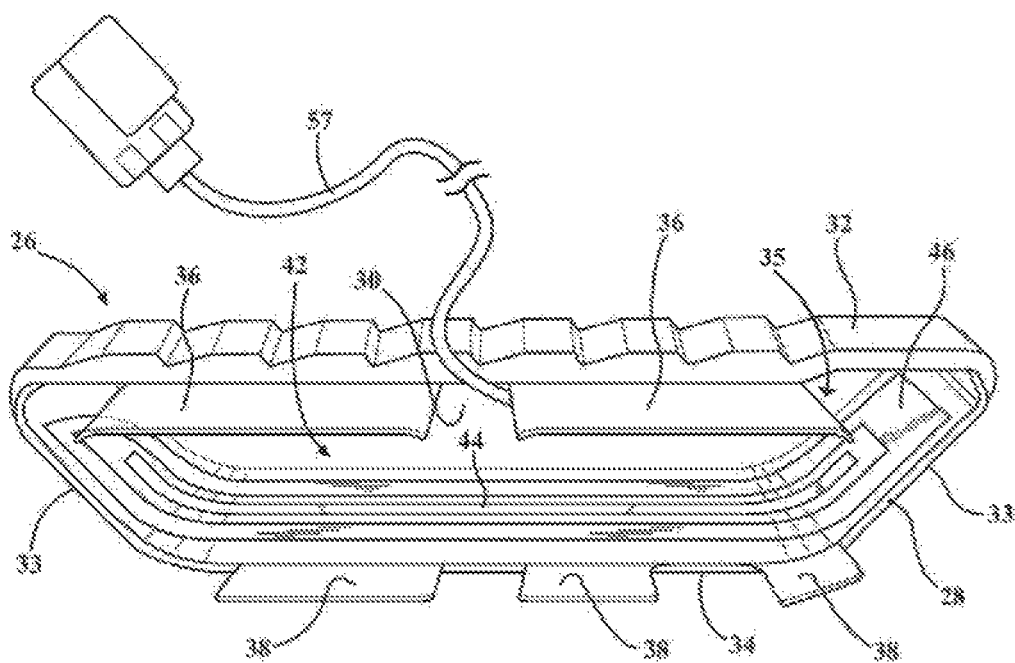
FIG. 4 is an end perspective view the end cap of FIG. 3.
Figure 5:
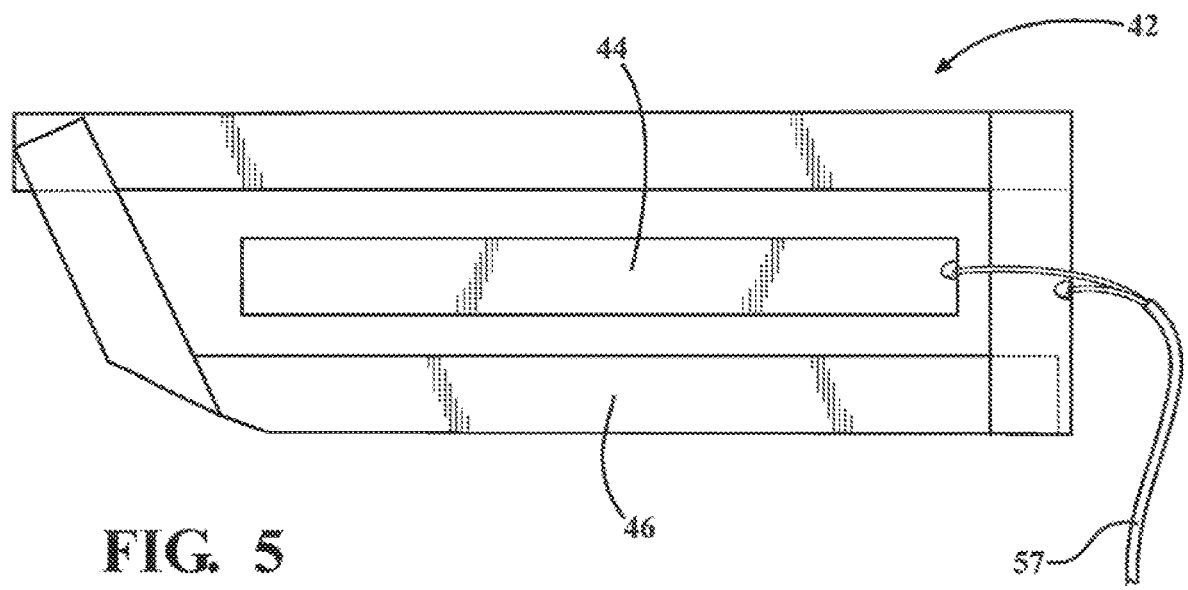
FIG. 5 is plan view showing a configuration of at least a portion of a sensor subassembly of the automated retractable step system of FIG. 2 in accordance with one aspect of the disclosure.

The step 24 can be provide as a generally lightweight platform, having a tubular body extending between opposite open ends 25, 27. The tubular body is shown, by way of example and without limitation, as having a generally rectangular shape with a top surface 29 and a bottom surface 31 extending between the opposite open ends 25, 27. The open ends 25, 27 of the tubular body are closed off by end caps 26 (FIGS. 3 and 4).

The end caps 26 are generally cup-shaped, having an inner cavity or pocket 35 extending into an open end 28 to a closed end 30. The end cap 26 has an upper surface or portion 32 configured to aligned in generally flush relation with the top surface 29 of the step tubular body and a lower surface or portion 34 configured to aligned in generally flush relation with the bottom surface 31 of the step tubular body with a pair of laterally spaced sidewalls 33 extending between and connecting the upper and lower portions 32 with one another. The sidewalls 33 are shown as extending upwardly from the lower portion 34 and diverging away from one another to the upper portion 32. To facilitate fixing the end cap 26 to the tubular body of the step 24, the end cap 26 further includes at least one, and shown as a plurality of upper tabs or protrusions 36 extending laterally from the upper portion 32 away from the open end 28 and pocket 35 and at least one, and shown as a plurality of lower tabs or protrusions 38 extending laterally from the lower portion 34 away from the open end 28 of the pocket 35 for insertion into the tubular body of the step 24 and securing the end cap 26 to the step 24. It will be appreciated that other fixing mechanisms for attaching the end caps 26 to the step 24 can be used, and further the step 24 and/or end cap 26 may be alternatively shaped or arranged than described or shown herein.

An actuator 40 (FIGS. 1-2 and 11) is operably coupled with the linkage subassembly 22 for moving the step 24 between the retracted, stowed position and the extended, deployed position. The actuator 40 includes a gear train subassembly 41 and an electric motor 43 operably coupled to the gear train subassembly 41 for moving the gear train subassembly 41 and the linkage subassembly 22 in response to an electrical voltage applied to the electric motor 43. It should be understood that the step 24 may be moved by alternative mechanisms or actuators 40 and linkage structures such as, but not limited to linear actuators, servo motors, rack and pinion, and electrohydraulic actuators.

Figure 6:
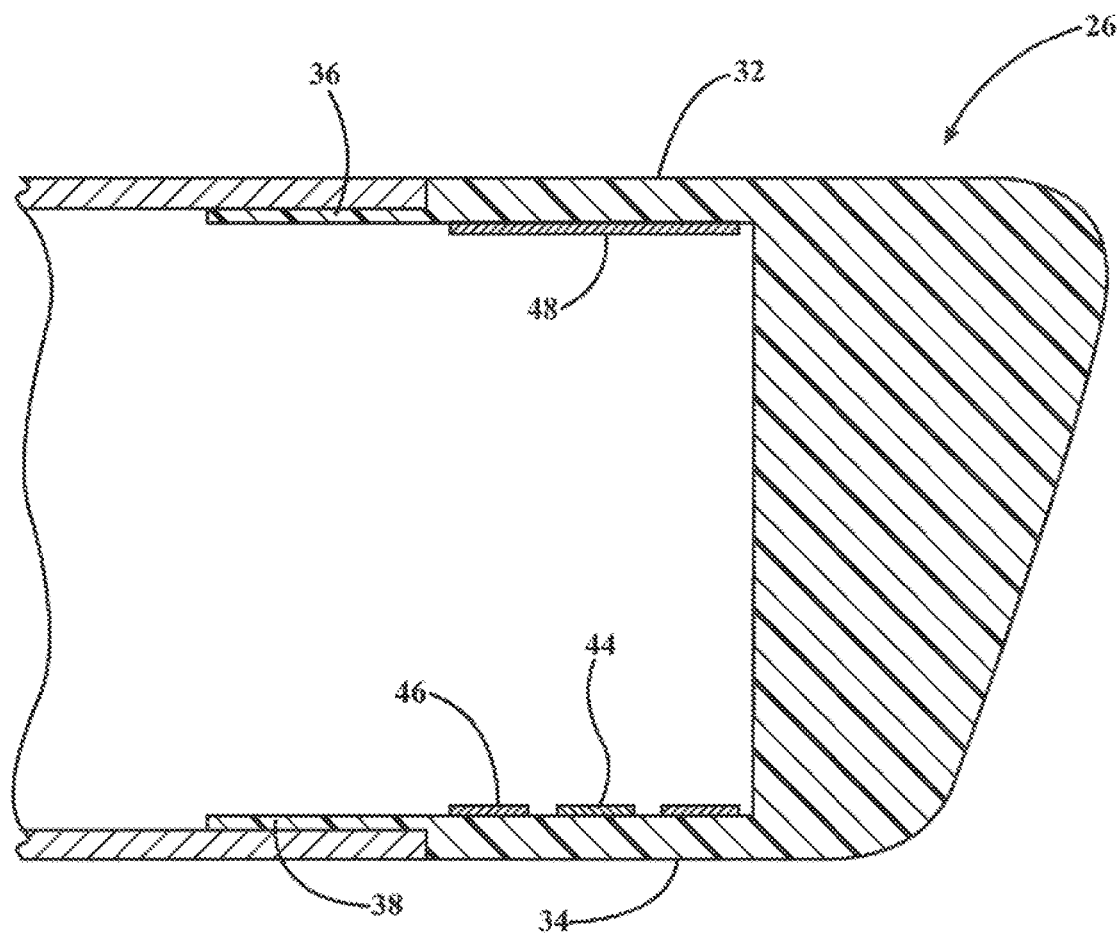
FIG. 6 is a side view showing the sensor subassembly of FIG. 5 with a shield electrode of the assembly lying in spaced relation thereover.
Figure 7:
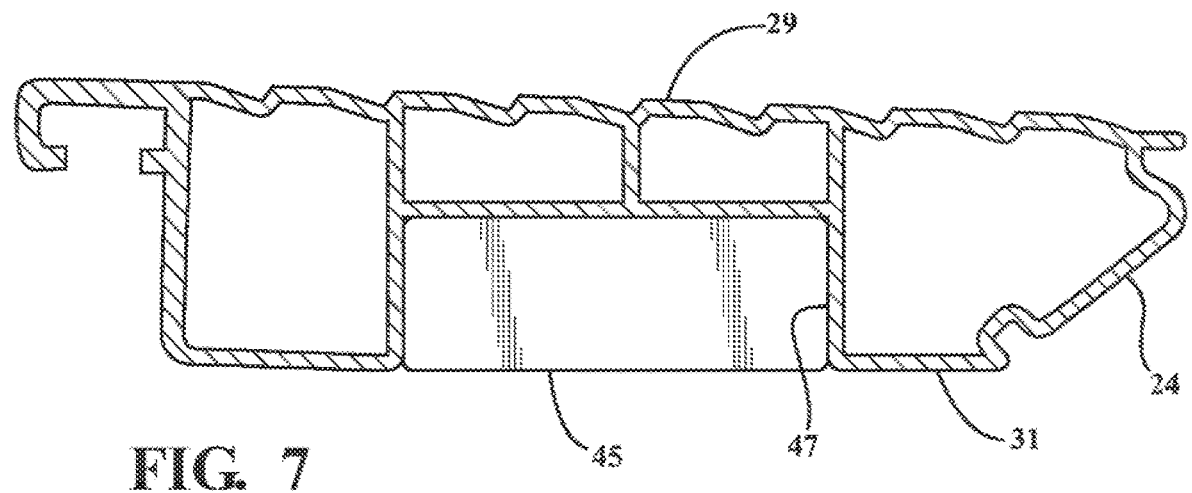
FIG. 7 is a cross-sectional end view of a step of an automated retractable step system in accordance with an aspect of the disclosure.
Figure 8:
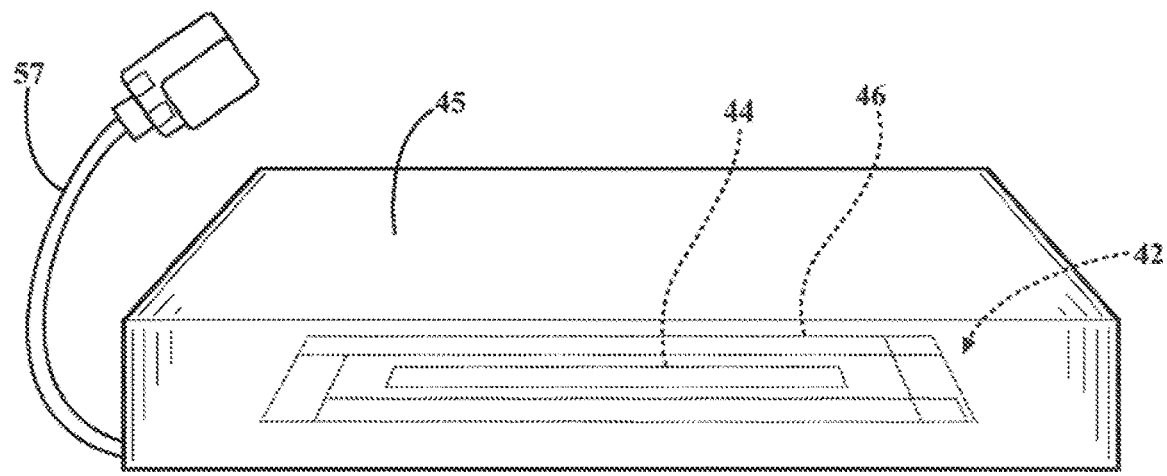
FIG. 8 is perspective view of a sensor subassembly of an automated retractable step of FIG. 7.

A sensor subassembly 42 (FIGS. 4-6 and 11) is operably attached to the actuator 40 and is shown attached to an inner surface of the lower portion 34 of the end cap 26, by way of example and without limitation. The sensor subassembly 42, also referred to as capacitive gesture sensor, includes a sensing electrode 44 extending lengthwise along the lower portion 34 of the end cap 26 and disposed extending between the open end 28 and the closed end 30 of the end cap 26. The sensor subassembly 42 also includes a reference electrode 46 disposed annularly about the sensing electrode 44, wherein the respective electrodes 44, 46 are shown as be coplanar or substantially coplanar, with the reference electrode 46 extending around the entirety or substantial entirety of the outer periphery of the lower portion 34 of the end cap 26 and in spaced relation about the centrally bounded sensing electrode 44. The sensor subassembly 42 additionally includes a driven shield electrode 48 (FIG. 6) attached to an inner surface of the upper portion 32 of the end cap 26 above the sensing electrode 44 and reference electrode 46 in overlying relation thereto. The driven shield electrode 48 is contained generally within a plane extending generally parallel to and in overlying, laterally spaced relation with the plane containing the sensing electrode 44 and the reference electrode 46. The driven shield electrode 48 minimizes parasitic capacitance between the vehicle frame and the sensing electrode 44 and the reference electrode 46, thereby enhancing the ability of the sensing electrode 44 to detect an object beneath the step 24, as intended. While the sensor subassembly 42 is described and shown as being attached to the inner surface of end cap 26, it should be recognized that the sensor subassembly 42 can be mounted or attached in alternate locations on or inside the vehicle. For example, the sensor subassembly 42 may alternatively be disposed underneath the step 24 (FIG. 7), wherein the sensor subassembly 42 can be protected by being sealed within a protective cover 45 (FIG. 8) and attached within a recessed housing or pocket 47 formed in the bottom surface 31 of the step 24. Additionally, it should be appreciated that the sensor subassembly 42 could alternatively be used for other vehicle applications, instead of, or in addition to the step 24, for example a running board. The sensor subassembly 42 can also be used with other powered devices.

Figure 9:
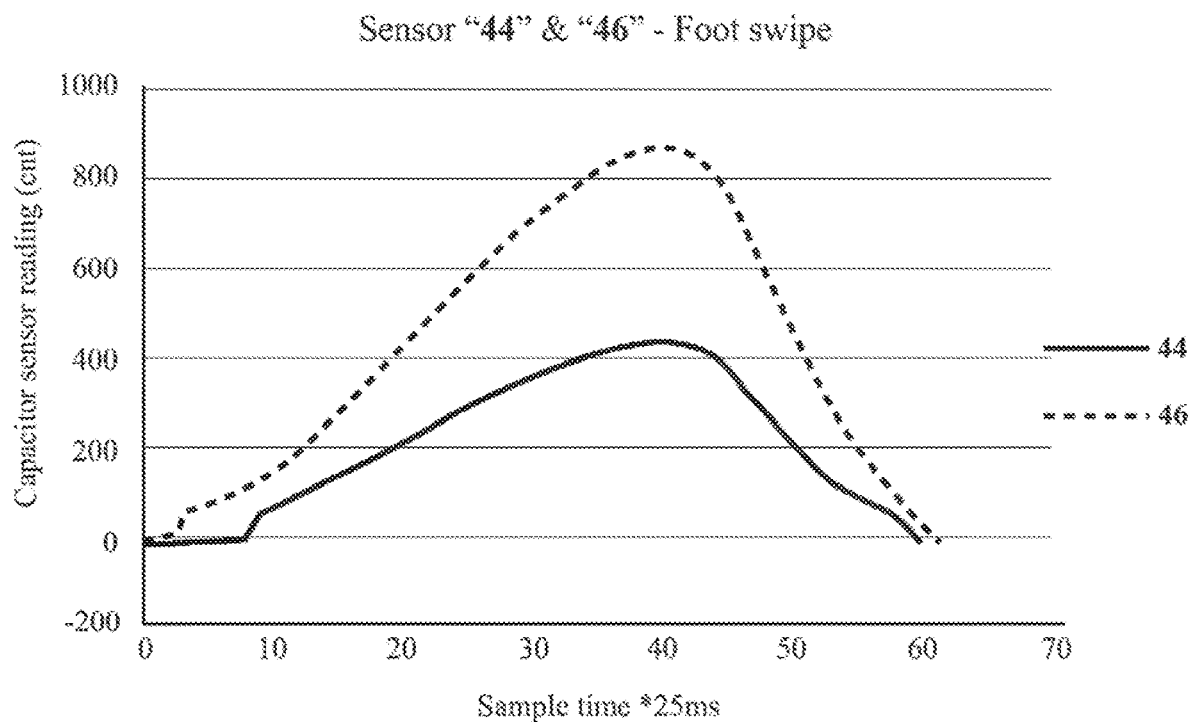
FIG. 9 is a graph illustrating capacitance versus time of a sensing electrode and reference electrode of an automated retractable step system in accordance with an aspect of the disclosure.
Figure 10:
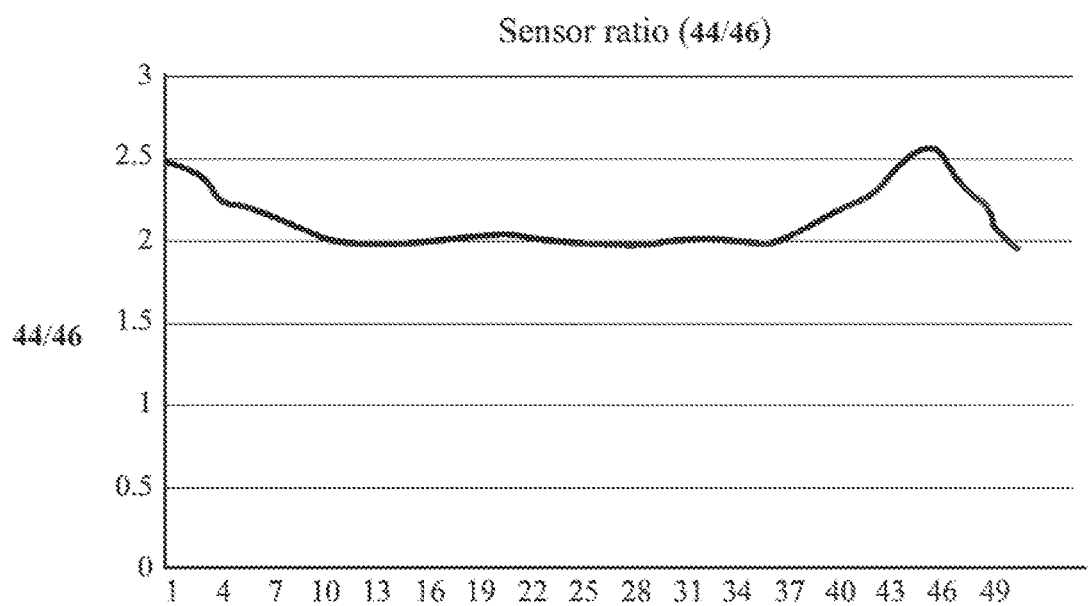
FIG. 10 is a graph illustrating a ratio versus time of the capacitance of the reference electrode to the capacitance of the sensing electrode of an automated retractable step system in accordance with an aspect of the disclosure.

The sensor subassembly 42 produces an electrostatic field and outputs a signal indicating the presence of an object in proximity to the sensing electrode 44 and reference electrode 46 (FIG. 9). As best shown in FIG. 10, the ratio between the capacitances of the sensing and reference electrodes 44, 46 is constant if the object is placed in front of or passing by the sensing electrode 44 and reference electrode 46. The capacitances and ratio of capacitances of the sensor subassembly 42 are defined by the following equations:

$Ca$=capacitance of sensing electrode 44=$\xi * Sa/d$;
$Cr$=capacitance of reference electrode 46=$*Sr/d$
(Where: $\xi$—dielectric constant, $Sa$ & $Sr$—electrode surface area, $d$—Object distance from electrodes).

The ratio: $Ca/Cr=Sa/Sr$.

With the ratio remaining constant between the two measured capacitances (i.e. $Ca=Cr$) when an object is placed in the front of the sensing electrode 44 and reference electrode 46, natural filtering of unwanted sensor activation is provided.

Sensor subassemblies 42 of the type described herein are generally capable of sensing materials such as paper, glass, liquids, cloth, and other nonmetallic materials including biological materials, such as body tissue. Additionally, sensor subassemblies 42 herein may also detect metal objects in proximity. The sensor subassembly 42 can include an oscillator circuit 50 and a detector or trigger circuit 52 (FIG. 11), both electrically connected to the sensing electrode 44 and to the reference electrode 46. As an object nears the sensor subassembly 42 and enters the electrostatic field produced by the sensing electrode 44 and the reference electrode 46, a change in the capacitance occurs in the oscillator circuit 50. As a result, the oscillator circuit 50 begins to oscillate and the trigger circuit 52 alters the signal output from the sensor subassembly 42 in response to a predetermined amplitude of oscillation from the oscillator circuit 50. As the object moves away from the sensing electrode 44 and the reference electrode 46 and away from the electrostatic field, the amplitude of the oscillation in the oscillator circuit 50 decreases and the trigger circuit 52 can change the output signal of the of the sensor subassembly 42, indicating that the object is no longer in proximity of the sensor and reference electrodes 44, 46. The ability of the sensor subassembly 42 to detect an object is determined by the object's size, the object's dielectric constant, and the object's distance from the sensing electrode 44 and reference electrode 46. Accordingly, the sensor subassembly 42 can be configured to avoid actuation of the step 24 in the presence of objects not meeting the preset criteria to cause actuation.

Figure 11:
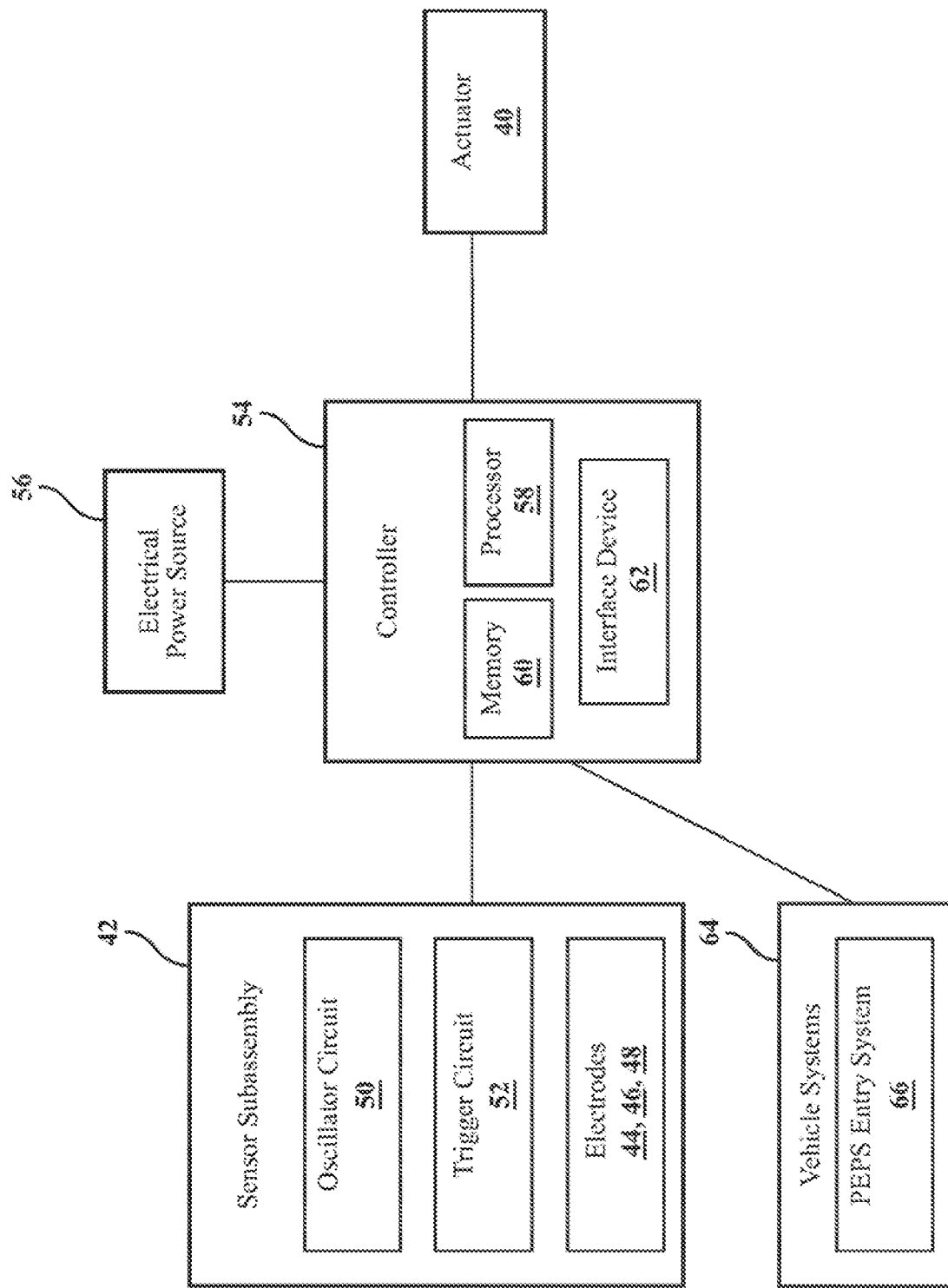
FIG. 11 is a block diagram generally depicting the various components of an automated retractable step system in accordance with an aspect of the disclosure.

As best shown in FIG. 11, sensor system is shown, including a controller 54 configured in electrical communication with an electrical power source 56, and can be directly connected thereto, as well as being connected for electrical communication with the sensing electrode 44, the reference electrode 46, and the driven shield electrode 48, such a via a wire harness 57. The controller 54 is also configured in electrical communication with the actuator 40 for commanding and controlling the actuator 40 to move the step 24 between the retracted, stowed position and the extended, deployed position in response to the signal from the sensor subassembly 42. The controller 54 may also filter the signal from the sensor subassembly 42 as necessary to filter unwanted signals from the sensor subassembly 42 to avoid an unwanted actuation of the step 24 (e.g. from water on or near the sensor subassembly 42). While the sensor subassembly 42 may include the oscillator circuit 50 and the trigger circuit 52 as described above, it should be appreciated that the sensor subassembly 42 may not include or employ these circuits 50, 52 and/or they may be disposed remotely from the sensor subassembly 42, such as in the controller 54, for example. Additionally, the controller 54 disclosed herein is described as a separate element, however, it should be understood that the controller 54, or a portion thereof, may be integrated into another electronic control module on the vehicle, such as, but not limited to a body control module (BCM).

The controller 54 includes a processor 58, also referred to as central processing unit ("CPU"), a memory 60, and an interface device 62. The memory 60 may include a variety of storage devices including internal memory and external mass storage typically arranged in a hierarchy of storage as understood by those skilled in the art. For example, the memory 60 may include databases, random access memory ("RAM"), read-only memory ("ROM"), flash memory, and/or disk devices. The interface device 62 may include one or more network connections (e.g. CAN bus). The controller 54 may be adapted for communication with other data processing systems over a network via the interface device 62. For example, the interface device 62 may include an interface to a network such as a local area network ("LAN"), etc. As such, the interface may include suitable transmitters, receivers, etc. Thus, the controller 54 may be linked to other data processing systems or vehicle systems 64 by the network. The processor 58 may include or be operatively coupled to dedicated coprocessors, memory devices, or other hardware modules. The CPU 58 is operatively coupled to the memory 60 which stores an operating system for general management of the controller 54. The controller 54 may include a data store or database system for storing data and programming information. The database system may include a database management system and a database and may be stored in the memory 60 of the controller 54. In general, the controller 54 has stored therein data representing sequences of instructions which, when executed, operate the automated retractable step system 20 as described herein. Of course, the controller 54 may contain additional software and hardware a description of which is not necessary for understanding the present disclosure.

Thus, the controller 54 includes computer executable programmed instructions for directing the controller 54 to implement the embodiments of the present disclosure. The programmed instructions may be embodied in one or more hardware modules or software modules resident in the memory 60 of the controller 54 or elsewhere. Alternatively, the programmed instructions maybe embodied on a computer readable medium or product (e.g., a memory stick, etc.) which may be used for transporting the programmed instructions to the memory 60 of the controller 54. Alternatively, the programmed instructions may be embedded in a computer-readable signal or signal-bearing medium or product that is uploaded to a network by a vendor or supplier of the programmed instructions, and this signal or signal-bearing medium may be downloaded through an interface to the controller 54 from the network by end users or potential buyers.

Figure 12:
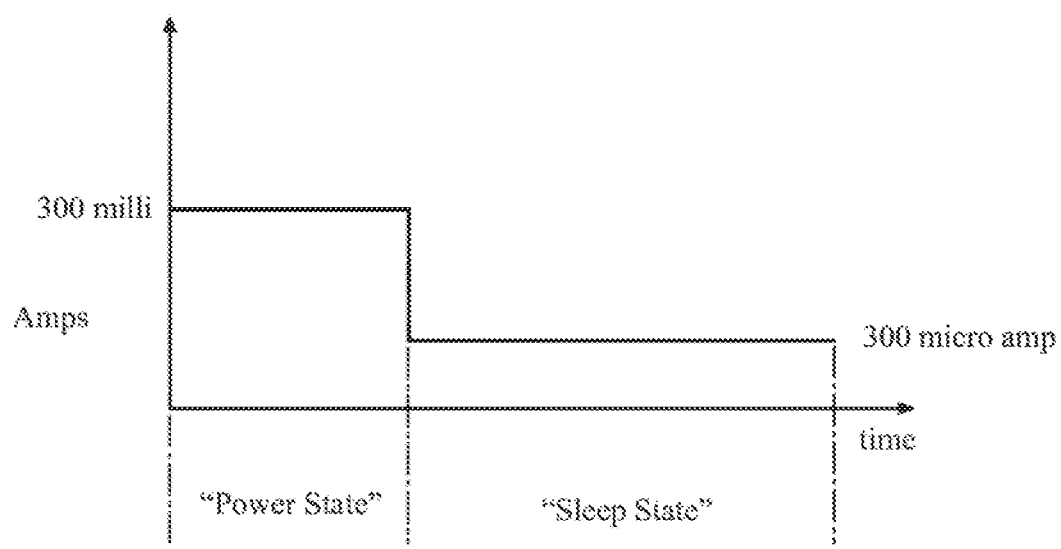
FIG. 12 is a graph illustrating current draw versus time of an automated retractable step system in accordance with an aspect of the disclosure in a power state and in a sleep state.

As shown in FIG. 12, the controller 54 has a sleep state and a power state and may be coupled with other vehicle systems 64 for receiving signals or messages indicating changes to the other vehicle systems 64 (e.g. change transmission gear selector to park and vehicle speed). The signals or messages of these vehicle systems 64 can be provided through various techniques such as, but not limited to hardwired inputs to the controller 54 or messages transmitted via a vehicle bus communication system (e.g. controller 54 area network, "CAN", local interconnect network "LIN") and received by the interface device 62 of the controller 54. The controller 54 additionally scans or monitors for signal of the sensor subassembly 42 at predetermined intervals of time. These intervals of time vary depending on if the controller 54 is operating in the sleep state or in the power state. For instance, in the sleep state, the controller 54 may only scan for signal of the sensor subassembly 42 every 23 milliseconds, whereas, during the power state, the controller 54 may scan for signal of the sensor subassembly 42 every 5 milliseconds. The sleep state is intended to reduce power consumption, more specifically, reduce the current draw of the sensor subassembly 42 during times when the controller 54 does not need to scan for the signal of the sensor subassembly 42. For example, as illustrated in FIG. 12, the current draw may be reduced from 300 milliamps in the power state to 300 microamps in the sleep state. The controller 54 is intended to remain in the sleep state while in motion, and the controller 54 transitions to the power state when the transmission is shifted into park. After the controller 54 signals the actuator 40 to move the step 24 to the deployed position, the step 24 is intended to remain in the deployed position until the transmission is shifted out of park and the vehicle speed is over a predetermined speed (e.g. 8 miles per hour). However, the step 24 could alternatively be moved back to the retracted position in response to some other command input, such as a manually activated switch, by way of example and without limitation.

According to another aspect of the disclosure, the automated retractable step system 20 is intended to be used without any authentication, if desired. In other words, if the vehicle is in park and the step 24 is in the retracted position, any object placed in proximity to the sensor subassembly 42 will cause the step 24 to be moved to the deployed position. Therefore, persons near the vehicle can purposefully cause the step 24 to be moved to the deployed position. This is advantageous, if for example, the automated retractable step system 20 is used with a truck at a worksite and a worker needs to access the truck bed, the worker can do so simply by intentionally activating the sensor subassembly 42, such as via placement of a foot, hand, or otherwise within proximity of the sensor subassembly 42, thereby not requiring authentication via a vehicle action, if the automated retractable step system 20 is configured in a setting by the vehicle owner to allow such non-authenticated deployment.

However, the automated retractable step system 20 may also work in conjunction with a passive entry-passive start (PEPS) entry system. The PEPS entry system 66 (FIG. 11) may include a keypad used for authentication and may also include a fob which is portable and includes a first transceiver for wireless communication. If the PEPS entry system 66 is used in conjunction with the automated retractable step system 20, the controller 54 may optionally include a second transceiver for wireless communication with the first transceiver of the fob, wherein the fob is used as authentication of an authorized user of the automated step 24 assembly. Alternatively, the fob may communicate with a separate module of the PEPS entry system 66, which then may communicate with the controller 54.

According to another aspect of the disclosure, the controller 54 can be configured having an unauthenticated mode and an authenticated mode. The controller 54 operates in the authenticated mode in response to the fob, by way of example and without limitation, wirelessly communicating with the controller 54 and authenticating the user. Likewise, the controller 54 operates in the unauthenticated mode in response to a lack of wireless communication with the fob. For example, if the fob is out of range of the controller 54 or otherwise unable to wirelessly communicate with the controller 54 to authenticate the user, the controller 54 will remain in the unauthenticated mode. Consequently, the controller 54 can command the actuator 40 to move the step 24 between the retracted, stowed position and the extended, deployed position in response to the signal from the sensor subassembly 42 while in the unauthenticated mode and in response to the controller 54 alone while operating in the authenticated mode.

Those skilled in the art will readily recognize that in addition to the applicability to an automated retractable step system 20, the sensor subassembly 42 and controller 54 may be used for controlling actuation of additional moveable vehicular members and functions. A non-limiting listing of such additional members and functions may include power window control, power release of vehicular doors in addition to lock/unlock functionality, and lock/unlock and power release of vehicle closures. It should also be recognized that the retractable step 24 system or additional vehicular functions being controlled may be located remotely from the sensor subassembly 42.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Those skilled in the art will recognize that concepts disclosed in association with an example automated retractable step system 20 can likewise be implemented into many other vehicular systems to control one or more operations and/or functions. Means of activating the actuator 40 and moving the step 24, other than the use of capacitive gesture sensing may be employed. These alternatives to capacitive sensors may include, without limitation, resistive sensors, temperature sensors, and optical scanners or any combination thereof provided that they are non-force based inputs.

Obviously, many modifications and variations of the present disclosure are possible in light of the above teachings and may be practiced otherwise than as specifically described while within the scope of the appended claims.

What is claimed is:

1. An automated retractable step for a motor vehicle, comprising:
   a linkage subassembly having a first end attached to a frame portion of the vehicle;
   a step operably coupled to a second end of said linkage subassembly and moveable between a non-deployed position when said linkage subassembly is located in a retracted position relative to the frame portion and a deployed position when said linkage subassembly is located in an extended position relative to the frame portion;

an actuator including an electric motor driving a gear train subassembly operably coupled to the linkage subassembly for moving said linkage subassembly between its retracted and extended positions;

a capacitive gesture sensor subassembly;

at least one endcap supporting said capacitive gesture sensor subassembly and mounted to said step; and a controller in operable communication with said capacitive gesture sensor subassembly and said electric motor for commanding said electric motor to drive said linkage subassembly from its retracted position into its extended position for moving said step from its non-deployed position into its deployed position in response to a signal from said capacitive gesture sensor subassembly, wherein said at least one endcap has an upper surface and a lower surface positioned in spaced relationship with said upper surface, wherein said capacitive gesture sensor subassembly includes a sensing electrode and a reference electrode connected to said lower surface of said at least one endcap, and wherein said capacitive gesture sensor subassembly further includes a driven shield electrode connected to said upper surface of said endcap and in an overlying relationship with said sensing electrode and said reference electrode.

2. The automated retractable step as set forth in claim 1 wherein said sensing electrode extends lengthwise across said lower surface of said at least one endcap, and wherein said reference electrode extends completely about and is spaced from said sensing electrode.

3. The automated retractable step as set forth in claim 1 wherein said step extends between a pair of open ends, and wherein said at least one endcap includes a pair of endcaps with each of said endcaps closing one of said ends of said step.

4. The automated retractable step as set forth in claim 1 wherein said controller is configured to be operated in a sleep state and a power state, wherein said controller scans for signals from said capacitive gesture sensor subassembly at a first predetermined frequency in said sleep state, wherein said controller scans for signals from said capacitive gesture sensor subassembly at a second predetermined frequency in said power state, and wherein said second predetermined frequency is greater than said first predetermined frequency.

5. The automated retractable step as set forth in claim 4 wherein said controller is configured to operate in said power state in response to a detection that a transmission of the vehicle shifts from a drive mode to a park mode.

6. The automated retractable step as set forth in claim 1 wherein said controller is configured to selectively operate in an unauthenticated mode and an authenticated mode, wherein when said controller operates in said unauthenticated mode, said controller is configured to move said step from said retracted position to said deployed position in response to any detection of movement in front of said capacitive gesture sensor subassembly, and wherein when said controller operates in said authenticated mode, said controller is configured to move said step from said retracted position to said deployed position only in response to both a detection of movement in front of said capacitive gesture sensor subassembly and a detection of a wireless communication device being in close proximity to the vehicle.

7. An automated retractable step for a motor vehicle, comprising:

a step moveable between a retracted, stowed position, and an extended, deployed position;

an actuator operably coupled with said step and configured to provide the movement of said step between said retracted, stowed position, and said extended, deployed position;

a sensor subassembly connected to said step and configured to detect movement proximate to said step; and a controller in communication with said sensor subassembly and with said actuator and configured to command said actuator to move said step between said retracted, stowed position and said extended, deployed position in response to a signal from said sensor subassembly, wherein a bottom surface of said step defines a pocket, wherein a protective cover is positioned in said pocket, and wherein said sensor subassembly is sealed within said protective cover.

8. The automated retractable step as set forth in claim 7 wherein at least one endcap is connected to said step, and wherein said endcap supports said sensor subassembly.

9. The automated retractable step as set forth in claim 8 wherein said step extends between a pair of open ends, and wherein said at least one endcap includes a pair of endcaps with each of said endcaps closing one of said open ends of said step.

10. The automated retractable step as set forth in claim 7 wherein said controller is configured to be operated in a sleep state and a power state, wherein said controller scans for signals from said sensor subassembly at a first predetermined frequency in said sleep state, wherein said controller scans for signals from said sensor subassembly at a second predetermined frequency in said power state, and wherein said second predetermined frequency is greater than said first predetermined frequency.

11. The automated retractable step as set forth in claim 10 wherein the controller is configured to operate in the power state in response to a detection that a transmission of the vehicle shifts from a drive mode to a park mode.

12. The automated retractable step as set forth in claim 7 wherein said controller is configured to selectively operate in an unauthenticated mode and an authenticated mode, wherein when said controller operates in said unauthenticated mode said controller is configured to move said step from said retracted position to said deployed position in response to any detection of movement in front of said sensor subassembly, and wherein when said controller operates in said authenticated mode said controller is configured to move said step from said retracted position to said deployed position only in response to both a detection of movement in front of said sensor subassembly and a detection of a wireless communication device in close proximity to the vehicle.

13. An automated retractable step for a motor vehicle, comprising:

a step coupled to a frame of the vehicle and moveable between a retracted, stowed position, and an extended, deployed position;

an actuator operably coupled with said step and configured to provide said movement of said step between said retracted, stowed position, and said extended, deployed position;

a capacitive gesture sensor subassembly connected to said step and configured to detect movement proximate to said step; and a controller in communication with said capacitive gesture sensor subassembly and with said actuator and configured to command said actuator to move said step between said retracted, stowed position and said extended, deployed position in response to a signal from said sensor subassembly indicating a detection of movement proximate to said step, wherein a bottom surface of said step defines a pocket, wherein a protective cover is positioned within said pocket, and wherein said capacitive gesture sensor subassembly is sealed within said protective cover.

14. The automated retractable step for a motor vehicle as set forth in claim 13 wherein at least one endcap is connected to said step, and wherein said at least one endcap supports said capacitive gesture sensor subassembly.

15. The automated retractable step as set forth in claim 13 wherein said controller is configured to be operated in a sleep state and a power state, wherein said controller scans for signals from said capacitive gesture sensor subassembly at a first predetermined frequency in said sleep state, wherein said controller scans for signals from said capacitive gesture sensor subassembly at a second predetermined frequency in said power state, and wherein said second predetermined frequency is greater than said first predetermined frequency.

16. The automated retractable step as set forth in claim 15 wherein said controller is configured to operate in said power state in response to a detection that a transmission of the vehicle shifts from a drive mode to a park mode.

17. The automated retractable step as set forth in claim 13 wherein said controller is configured to selectively operate in an unauthenticated mode and an authenticated mode, wherein when said controller operates in said unauthenticated mode said controller is configured to move said step from said retracted position to said deployed position in response to any detection of movement in front of said capacitive gesture sensor subassembly, and wherein when said controller operates in said authenticated mode said controller is configured to move said step from said retracted position to said deployed position only in response to both a detection of movement in front of said capacitive gesture sensor subassembly and in response to a detection of a wireless communication device in close proximity to the vehicle.

* * * * *